US010820374B2

(12) United States Patent
Piironen et al.

(10) Patent No.: US 10,820,374 B2
(45) Date of Patent: Oct. 27, 2020

(54) GATEWAY DEVICE FOR WIRELESS NETWORKS

(71) Applicant: BITTIUM WIRELESS OY, Oulu (FI)

(72) Inventors: Timo Piironen, Oulu (FI); Jaakko Hulkko, Oulu (FI); Veli Matti Lastumäki, Oulu (FI)

(73) Assignee: BITTIUM WIRELESS OY, Oulu (FI)

( * ) Notice: Subject to any disclaimer, the term of this patent is extended or adjusted under 35 U.S.C. 154(b) by 0 days.

(21) Appl. No.: 16/410,031

(22) Filed: May 13, 2019

(65) Prior Publication Data

US 2019/0350050 A1 Nov. 14, 2019

(30) Foreign Application Priority Data

May 14, 2018 (EP) ................................ 18172008

(51) Int. Cl.
*H04W 88/16* (2009.01)
*H04W 76/12* (2018.01)
*H04L 5/14* (2006.01)
*H04W 4/10* (2009.01)
*H04W 88/02* (2009.01)
*H04W 84/04* (2009.01)

(52) U.S. Cl.
CPC .............. *H04W 88/16* (2013.01); *H04L 5/14* (2013.01); *H04W 4/10* (2013.01); *H04W 76/12* (2018.02); *H04W 88/02* (2013.01); *H04W 84/042* (2013.01)

(58) Field of Classification Search
CPC ....... H04W 88/16; H04W 76/12; H04W 4/10; H04W 88/02; H04W 84/042; H04W 92/18; H04W 84/08; H04W 88/04; H04W 88/06; H04W 76/45; H04W 84/18; H04L 5/14

See application file for complete search history.

(56) References Cited

U.S. PATENT DOCUMENTS

2004/0190468 A1* 9/2004 Saijonmaa ........ H04L 29/06027 370/312
2017/0347392 A1 11/2017 Cushing

OTHER PUBLICATIONS

Extended Search Report for EP 18172008.7, dated Nov. 22, 2018, 8 pages.

* cited by examiner

*Primary Examiner* — Dady Chery
(74) *Attorney, Agent, or Firm* — Nixon & Vanderhye PC

(57) ABSTRACT

This document discloses a solution for connecting wireless networks. According to an aspect, a method comprises: establishing, by a gateway device, a first physical layer connection with a first device of a two-way radio network operating according to a two-way radio network protocol, establishing, by the gateway device, a second physical layer connection with a second device of a wireless network operating according to a wireless communication protocol different from the two-way radio network protocol; and connecting, by the gateway device, a communication connection established between the second device and the wireless network to the first device through the first physical layer connection and the second physical layer connection.

11 Claims, 5 Drawing Sheets

GATEWAY DEVICE FOR WIRELESS NETWORKS

This application claims priority to EP Patent Application No. 18172008.7 filed 14 May 2018, the entire contents of which is hereby incorporated by reference.

TECHNICAL FIELD

The invention relates to a gateway solution for connecting wireless networks.

TECHNICAL BACKGROUND

A land mobile radio system (LMRS) is a wireless communication system intended for use by terrestrial users in vehicles or on foot. The LMRS is sometimes called a professional mobile radio system (PMRS). Examples are walkie-talkies and two way radios in vehicles. Examples of LMRSs include Terrestrial Trunked Radio (TETRA), Project 25 radio system, and Digital Mobile Radio specified by ETSI. Such systems are typically used by emergency first responder organizations such as police, fire, and ambulance services, public works organizations, dispatched services such as taxis, or companies with large vehicle fleets or numerous field staff. Typical features of the LMRSs may include operation on a very high frequency (VHF) range or ultra-high frequency (UHF) range and that they support half duplex communication. This means that only one radio can transmit at a time on a channel, although any number of radios are capable of receiving on the channel. A radio is normally in a receive mode and switched to a transmit mode when a user presses a push-to-talk (PTT) button on the radio.

An LMRS may be an independent network, but can be connected to other systems such as a public switched telephone network (PSTN) or a cellular network. Conventionally, the connection between the LMRS and the other network is carried out in a fixed network infrastructure.

BRIEF DESCRIPTION

The invention is defined by the independent claims. Embodiments are defined in the dependent claims.

According to an aspect, there is provided a method for connecting wireless networks, the method comprising: establishing, by a gateway device, a first physical layer connection with a first device of a two-way radio network operating according to a two-way radio network protocol, establishing, by the gateway device, a second physical layer connection with a second device of a wireless network operating according to a wireless communication protocol different from the two-way radio network protocol; and connecting, by the gateway device, a communication connection established between the second device and the wireless network to the first device through the first physical layer connection and the second physical layer connection.

In an embodiment, the gateway device is an accessory device of one of the first device and the second device.

In an embodiment, the method further comprises performing, by the gateway device, adaptation between full duplex communication of the communication connection and half duplex communication of the two-way radio network.

In an embodiment, said performing the adaptation comprises as performed by the gateway device: receiving a push-to-talk request from one of the first device and the second device; adapting the push-to-talk request for the other one of the first device and the second device and transmitting the adapted push-to-talk request to the other one of the first device and the second device; receiving, from the other one of the first device and the second device, a push-to-talk grant message; and adapting the push-to-talk grant message for the one of the first device and the second device and transmitting the adapted push-to-talk grant message to the one of the first device and the second device.

In an embodiment, the first physical layer connection and the second physical layer connection are wired connections.

In an embodiment, the gateway device is integrated into a cable connecting the first device and the second device.

In an embodiment, the method further comprises: receiving, by the gateway device, digital non-voice data of the communication connection from the second physical layer connection; converting, by the gateway device, the digital non-voice data and transmitting the converted non-voice data to the first physical layer connection.

In an embodiment, the method further comprises: receiving, by the gateway device, an AT command from the second device over the second physical layer connection; and extracting the AT command performing, by the gateway device, a function instructed by the AT command.

In an embodiment, the method further comprises by the gateway device: providing, by the gateway device, a device-to-device communication connection between the first device and the second device while neither the first device nor the second device is connected to a base station of the respective network.

According to another aspect, there is provided a gateway device comprising: a first interface configured to provide a first physical layer connection with a first device of a two-way radio network operating according to a two-way radio network protocol, a second interface configured to provide a second physical layer connection with a second device of a wireless network operating according to a wireless communication protocol different from the two-way radio network protocol; and a processing circuitry configured to connect a communication connection established between the second device and the wireless network to the first device through the first physical layer connection and the second physical layer connection.

In an embodiment, the gateway device further comprises an audio conversion circuitry configured to perform audio conversion between the first physical layer connection and the second physical layer connection.

In an embodiment, the audio conversion circuitry is configured to output an audio signal received from one of the first physical layer connection and the second physical layer connection and output the audio signal in a converted form to the other one of the first physical layer connection and the second physical layer connection, and further configured to output audio signal in a converted form to an audio speaker of the gateway device.

In an embodiment, the gateway device is an accessory device of one of the first device and the second device.

In an embodiment, the processing circuitry is configured to perform adaptation between full duplex communication of the communication connection and half duplex communication of the two-way radio network.

In an embodiment, the gateway device is integrated into a cable configured to connect the first device and the second device.

According to an aspect, there is provided a mobile radio device comprising: a radio interface for establishing a radio connection with a wireless network operating according to a wireless communication protocol; a further interface for establishing a physical layer connection with a gateway device; a communication controller circuitry configured to connect, through the gateway device, the radio connection with the wireless network to a two-way radio network operating according to a two-way radio network protocol, wherein the wireless communication protocol is different from the two-way radio network protocol communication protocol.

In an embodiment, the mobile radio device further comprises an application processor configured to execute an application layer application in the mobile radio device, the application configured to control the connection between the wireless network and the two-way radio network through an application programming interface comprised in the mobile radio device and to provide a user interface to a user of the mobile radio device.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

The following embodiments are examples. Although the specification may refer to "an", "one", or "some" embodiment(s) in several locations, this does not necessarily mean that each such reference is referring to the same embodiment (s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
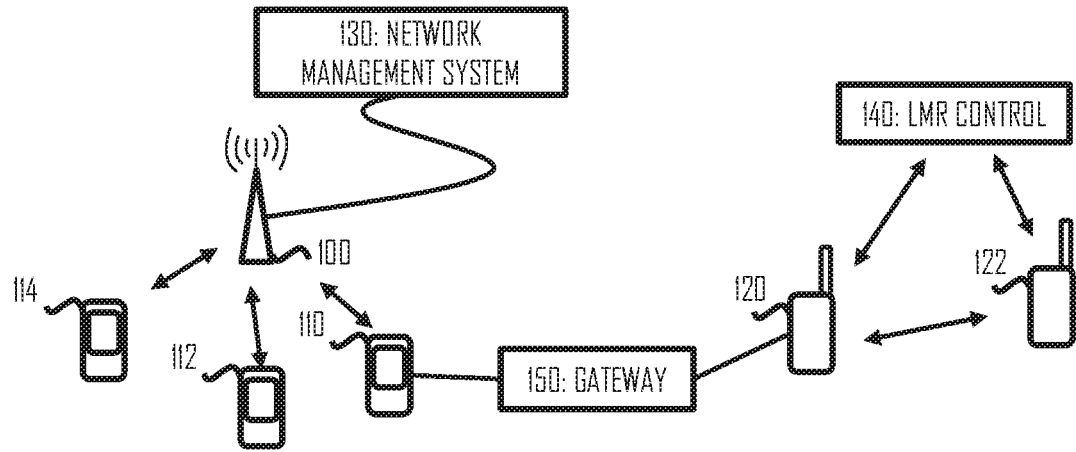
FIG. 1 illustrates a wireless communication scenario to which embodiments of the invention may be applied.

FIG. 1 illustrates a wireless communication scenario to which embodiments of the invention may be applied. Referring to FIG. 1, there is provided a land mobile radio (LMR) network. The LMR network may include one or more LMR devices 120, 122 and, in some embodiments, a network controller 140 managing the LMR network. If the LMR network operates in a trunked mode, the LMR controller 140 typically handles channel allocation and grants access to channel in half duplex operation. If the LMR network operates in a conventional mode or a direct mode, the LMR devices 120 handle the channel selection and the separate LMR controller 140 may be omitted. The LMR may operate according to specifications of any one of the LMR technologies described in Background. The LMR network may be void of any base stations or a fixed access network infrastructure.

Furthermore, there is provided a non-LMR network comprising a base station or an access node 100 and a plurality of terminal devices 110, 112, 114. The non-LMR network may comprise a fixed access network infrastructure in the form of a network of base stations or access nodes 100. The base station 100 may be connected to a network management system such as a core network. The non-LMR network may support a cellular communication protocol according to Third Generation Partnership Project, 3GPP, specifications or a wireless communication protocol according to IEEE 802.11 specifications. The cellular communication protocol which may be provided according to one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The protocol according to the 802.11 specifications may support one or more of the following: 802.11b, 802.11g, 802.11n, and 802.11ac.

FIG. 1 further illustrates a method for connecting the device(s) of the LMR network with the device(s) of the non-LMR network. As illustrates in FIG. 1, a gateway between the LMR network and the non-LMR network is established between one of the radio devices 120 of the LMR network and one of the radio devices 110 of the non-LMR network. In other words, a gateway device 150 provides a gateway by connecting directly to the respective devices 110, 120. In this manner, the gateway is established on a terminal device level which is a lower level than in conventional solutions where the gateway would be established between the network management system 130 and the LMR controller 140, for example. In other words, the gateway is in a user device or a client device operated directly by a user.

In the embodiment of FIG. 1 and the embodiments described below, the gateway device is described to provide the gateway between the LMR network and the non-LMR network. In other words, the gateway device connects the LMR network to the non-LMR network. This may be considered as a preferred embodiment. However, embodiments of the invention are applicable to scenarios where the gateway device connects a device of a two-way radio network with a device of another type of radio network. Examples of the two-way radio network include not only the LMR network but also a satellite radio network or a high-frequency (HF) band radio system. Specifications of typical two-way radios include half-duplex operation amongst devices of the network that operate on the same channel. The half-duplex operation means that an operator of a radio device can talk or listen but not both at the same time. Access to talk/transmit is acquired through a push-to-talk procedure triggered upon the operator pressing a push-to-talk button on the radio device. Release of the button releases the channel and deactivates the transmission. In some embodiments, voice activation (VOX) replaces the push-to-talk function. Another feature of the two-way radios is that all devices of the network operate on the same frequency channel concurrently. This distinguishes from cellular networks, for example, in the sense that terminal devices may be allocated with transmission bands on different frequencies within respective cells, and the call connection is carried out in a network infrastructure of the cellular network.

Figure 2:
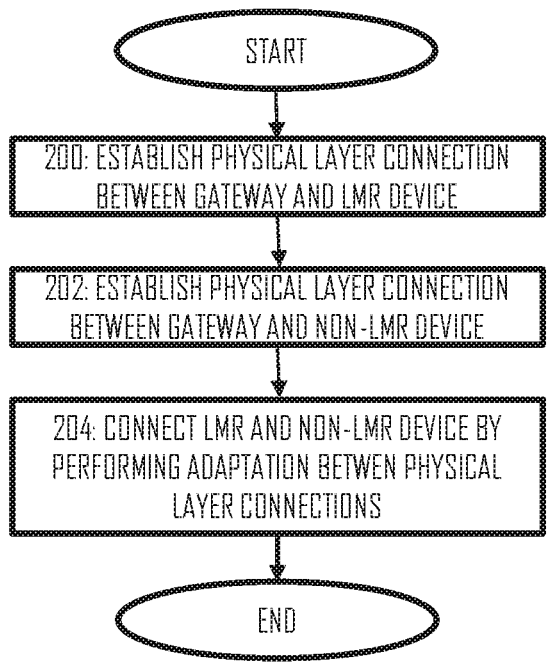
FIG. 2 illustrates a process for establishing a gateway between a land mobile radio network and another type of network according to an embodiment.

FIG. 2 illustrates an embodiment of the method of providing the gateway. Referring to FIG. 2, the method comprises: establishing (block 200), by the gateway device 150, a first physical layer connection with a first device 120 of the LMR network operating according to a LMR network protocol; establishing (block 202), by the gateway device, a second physical layer connection with a second device 110 of the wireless network operating according to the non-LMR communication protocol; and providing (block 204), by the gateway device, a communication connection between the first device 110 and the second device 120 by performing adaptation between the first physical layer connection and the second physical layer connection.

When the gateway device has the physical layer connection to the devices 110, 120, efficiency in the gateway provision is achieved. For example, latencies may be reduced.

In an embodiment, the gateway device is configured to perform link or network layer adaptation between the networks.

In an embodiment, the gateway device may connect a logical connection established between the second device 120 and an access node of the non-LMR network to the LMR network. This enables transfer of data received from the non-LMR network to the LMR network and/or transfer of data received from the LMR network to the non-LMR network. This separates the embodiment from conventional multi-radio solutions where a device has options of selecting either the LMR network or the non-LMR network as means for transmitting or receiving data.

The gateway device is configured to perform more than mediation of information between the two networks. In an embodiment, the gateway device is configured to terminate a message, data, or a command received from the first or second device. For example, the first or second device may control the operation of the gateway device and the gateway device may respond to the detection of the received command. The response may be reconfiguration of the gateway device in such manner that the gateway device does not deliver the command to the other device that did not originate the command. In another embodiment, the gateway device may be a source of a command delivered to at least one of the first device and the second device. For example, a user interface of the gateway device may be used to input control commands that configure the operation of the first and/or second device. In another embodiment, a message received from one of the first and second device may trigger the adaptation of the message and delivery to the other one of the first and second device and, further, trigger another function in the gateway device, e.g. user interface output. Detailed embodiments are described below.

In an embodiment the gateway device further provides a device-to-device communication connection between the LMR device and the non-LMR device while neither the device is communicating in a radio network. For example, the gateway device may provide the physical layer connections with the devices in a situation where radio interface of the LMR device is disabled and where a radio interface of the non-LMR device is in an idle mode or disabled.

In another embodiment, the gateway device further provides a device-to-device communication connection between the LMR device and the non-LMR device while neither the device is connected to a base station in the respective network or to a network in general. Referring to FIG. 1, the gateway device may provide the gateway in a situation where the non-LMR device 110 has established a radio connection (e.g. a voice call connection) that is not routed through the base station 100. Members of the radio connection may thus be connected to the LMR network through the gateway device 150. In a similar manner, the LMR network may operate in a mode where the LMR device 120 is not connected to the LMR controller 140 but communicates directly with the other LMR devices 122 of the LMR network.

Figure 3:
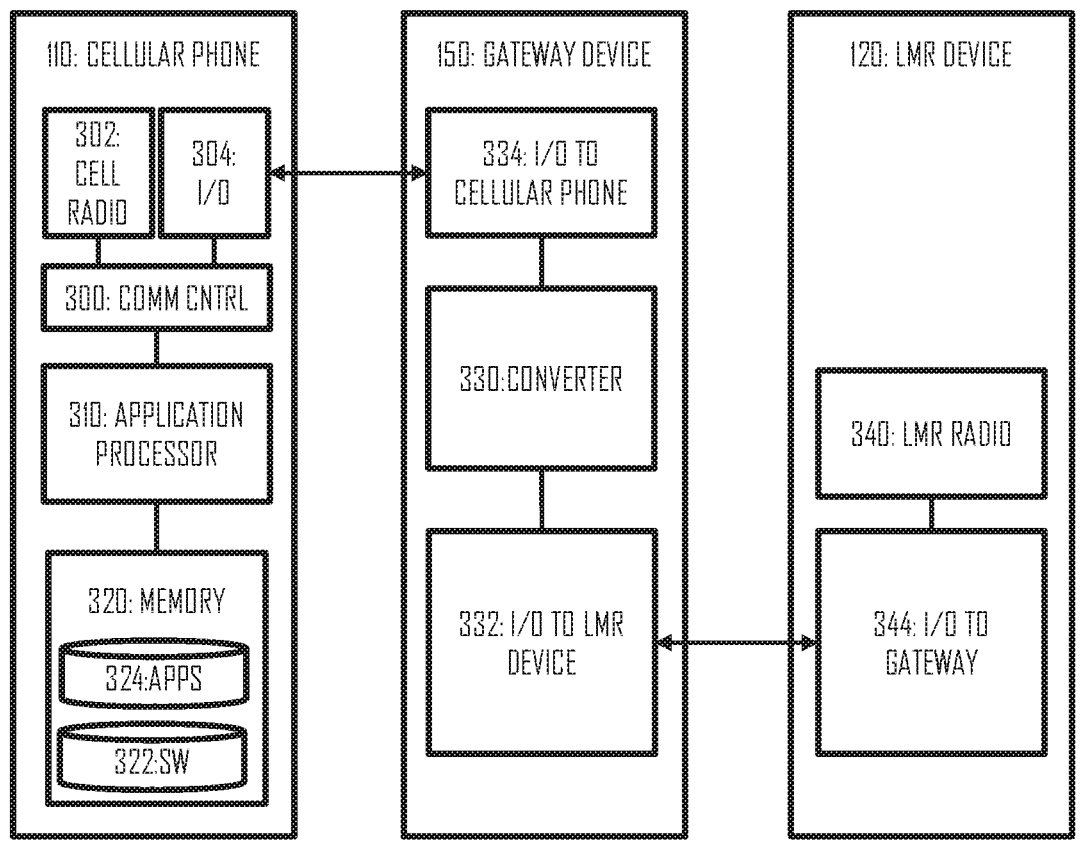
FIG. 3 illustrates block diagrams of devices involved in the establishment of the gateway according to some embodiments.

FIG. 3 illustrates a system for establishing the gateway according to an embodiment of the invention. Referring to FIG. 3, the system comprises the devices 110, 120 between which the gateway is established and the gateway device 150. In this embodiment, the device 110 is a cellular phone comprising a radio modem 302 complying with specifications of any one of the cellular communication protocols described above and, optionally or alternatively, the 802.11 specifications. The cellular phone may further comprise an interface 304 to the gateway device. The interface may comprise one or more of the following interfaces: a universal serial bus (USB) interface, Universal Asynchronous Receiver Transmitter (UART) interface, or a Bluetooth® Low Energy or Bluetooth Smart modem. The cellular phone may further comprise a communication controller 300 configured to control the modules 302, 304 in the gateway mode, for example. The communication controller may be realized by a circuitry or a processor configured by software.

The cellular phone may be a smart phone comprising a sophisticated operating system such as Android® or iOS®. An application processor 310 comprised in the cellular phone executes the operating system and one or more mobile applications supporting the operating system. A memory 320 may store one or more computer program products 322 defining the operating system, device drivers, and other device control functions that are executed by the application processor 300. The mobile applications 324 may also be stored in the memory 320 readable by the application processor 310. The mobile applications may include a special purpose application configured to manage calls or connections of the cellular phone that are bridged between the cellular network and the LMR network. The application processor 310 may, upon receiving a user input, launch the application and output a user interface of the application to the user through a user interface of the cellular phone. The user may then operate the user interface of the application to control the connections routed through the gateway device.

The memory 320 may be implemented using any suitable data storage technology, such as semiconductor based memory devices, flash memory, magnetic memory devices and systems, optical memory devices and systems, fixed memory and removable memory.

The LMR device 120 may be a conventional LMR device comprising an LMR radio modem 340 and associated radio front-end components and, further, comprising an interface 344 to the gateway device 150. The interface 344 may comprise an analogue audio interface and/or a UART interface, for example.

The gateway device 150 may comprise an interface 334 matched with the interface 304 of the cellular phone 110 and an interface 332 matched with the interface 344 of the LMR device. The interfaces 334 and 332 may support the same, only partially same, or different communication protocols, and the gateway device 150 may further comprise a converter 330 configured to perform adaptation between the interfaces 332, 334. The converter 330 may comprise a micro controller configured to perform digital signal processing required in the conversion. In an embodiment, the conversion includes at least protocol conversion between the protocols supported by the interfaces 332, 334. In an embodiment where the interface 334 is a digital interface and the interface 332 includes at least an analogue interface, the converter 330 may comprise required analogue-to-digital (A/D) and digital-to-analogue (D/A) converters.

In an embodiment, the converter comprises an audio conversion circuitry configured to perform audio conversion between the interfaces 332, 334. For example, the audio conversion circuitry may convert digital audio data received through the interface 334 into analogue audio data and output the analogue audio data to the interface 332. An example of the analogue audio interface comprised in the interface 332 is 4wire audio but other analogue audio interfaces conventionally used in LMR devices are equally applicable.

In an embodiment, the physical layer connections between the gateway device and the LMR device and the gateway device and the non-LMR device are wired connections. The established physical layer connections may support different communication protocols. The connection between the gateway device and the LMR device may comprise one or more of the following wired connections: UART, Ethernet, USB, and 4wire. The connection between the gateway device and the non-LMR device may comprise one or more of the following wired connections: USB, UART, digital audio such as inter-integrated-circuit sound (I2S), and a power-good pin. The power-good pin may deliver information on power supply, e.g. on stability of the power supply.

In another embodiment, the physical layer connections between the gateway device and the LMR device and the gateway device and the non-LMR device are wired links. Each physical layer connection may be realized by a Bluetooth Smart® link, for example. In case both connections are Bluetooth links, the gateway device may establish the Bluetooth links in different Bluetooth networks, i.e. the links would not belong to the same Bluetooth network.

In an embodiment, the gateway device is an accessory device of the LMR device and/or the non-LMR device.

Figure 4:
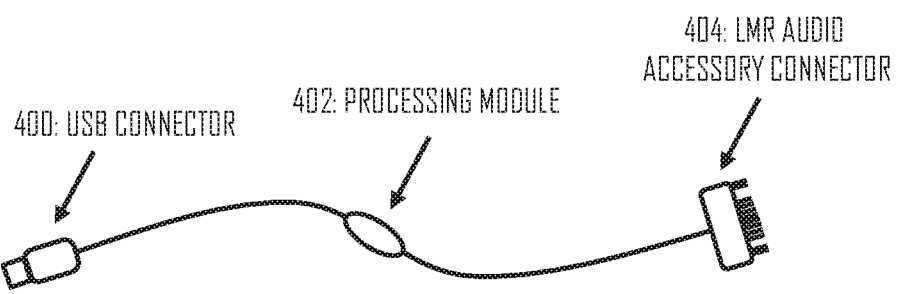
FIGS. 4 and 5 illustrate some embodiments of a gateway device.

In an embodiment, the gateway device is integrated into a cable connecting the LMR device and the non-LMR device. FIG. 4 illustrates such an embodiment. The cable may comprise a housing for a processing module comprising at least the converter 330 and at least some components of the interfaces 332, 334. Cables comprising the connectors to the LMR and non-LMR device may be integrated into the housing and appropriate connectors 400, 404 may be provided at ends of the cables. In the embodiment of FIG. 4, the cable connecting the gateway device to the non-LMR device comprises a USB connector 400, e.g. USB type C connector. The cable connecting the gateway device to the LMR device comprises an LMR audio accessory connector 404, thus enabling connection to standard walkie-talkies.

In another embodiment, the housing of the gateway device comprises the connector 400 and/or 404. Accordingly, the cables may be omitted. In this embodiment, the gateway device is integrated with at least one connector connecting the gateway device to the LMR and/or non-LMR device. The gateway device may be a plug-in device where the housing is plugged into a port in the device(s). A further mechanical attachment or locking mechanism may be provided to secure the electro-mechanical coupling. In some embodiments, the housing of the gateway device may operate as a mechanical adapter mechanically securing the LMR device to the non-LMR device.

In an embodiment, the gateway device comprises no user interface, as in the embodiment of FIG. 4.

Figure 5:
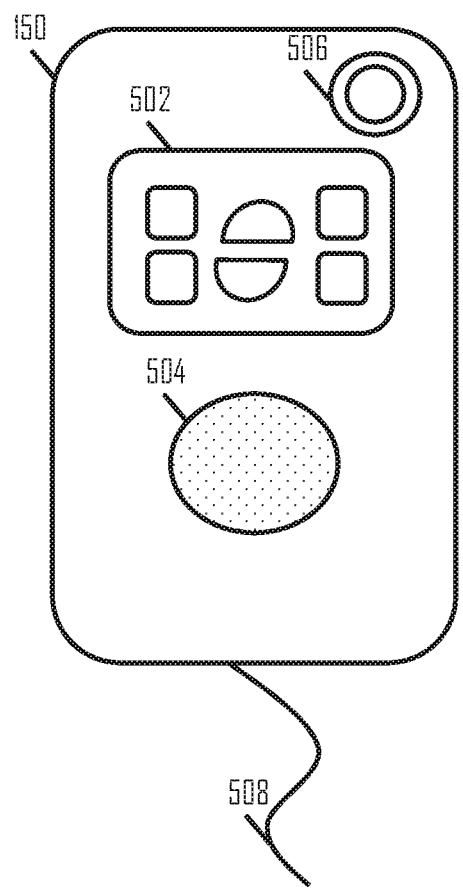
Figure 6:
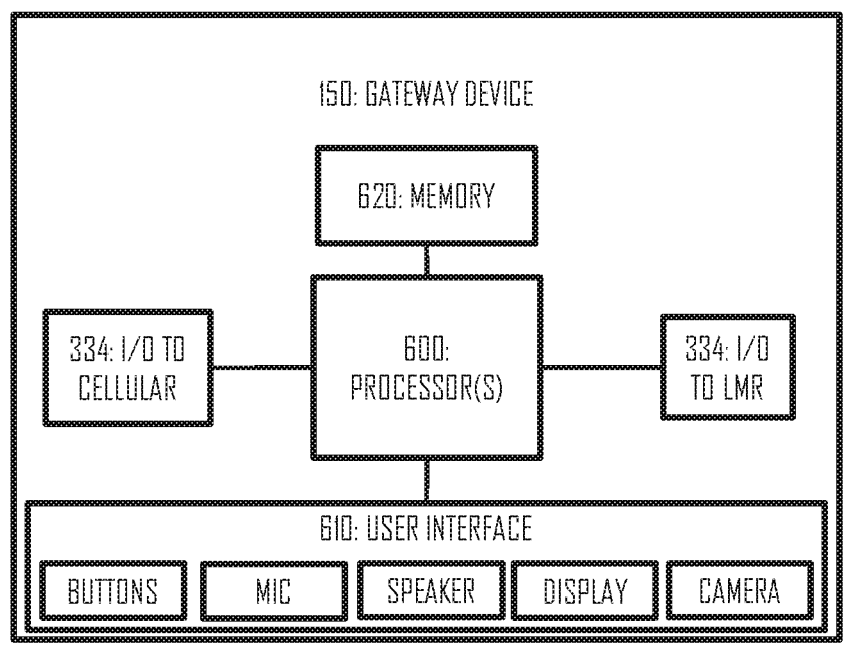
FIG. 6 illustrates a block diagram of a gateway device according to an embodiment.

FIG. 5 illustrates an embodiment of the gateway device 150 where the gateway device 150 is comprised in a mouthpiece or a headset of the LMR device. The gateway device may thus serve as a user interface for voice calls of the LMR and/or the non-LMR device. FIG. 6 illustrates as a block diagram at least some of the components of the gateway device according to this embodiment, although some of them may be optional. In this embodiment, the gateway device comprises the housing for the electronics such as the converter 330 and the interfaces 332, 334. As described above, the converter 330 may be realized by at least one processor 600 such as a micro controller. The housing may further house at least one memory 620. The memory may serve as a work memory for the processor(s) 600, and/or it may comprise computer program instructions defining the operation of the processor(s) 600. The user interface may comprise at least an audio speaker and a microphone 504. The user interface may further comprise a video camera 506 to enable video recording and video conference calls, for example. The user interface of the gateway device may further comprise a display device such as a display screen. The display device may include one or more light emitting diode (LED) indicators. One or more cables 508 may connect the gateway device to the LMR device and/or the non-LMR device.

The user interface may further comprise one or more buttons 502. The buttons may have different functions, and a function of a given button may differ depending on a mode of the gateway device, and the mode of the gateway device may be instructed from the application executed in the cellular phone (non-LMR device). The application described above may output an instructions of the mode of the gateway device and, upon receiving the instruction, the processor 600 may adopt the mode and configure the functions of the buttons and, optionally, the display device accordingly. Let us describe some of these embodiments next.

The gateway device may support at least a gateway mode in which the gateway device operates as the gateway between the LMR device and the non-LMR device. A user of the cellular phone may operate the application and select the gateway mode through the user interface of the cellular phone. The application detects the input and outputs an instruction about the gateway mode selection through an application programming interface (API) of the cellular phone. The cellular phone outputs the instruction through a control interface such as the UART or USB to the gateway device. Upon receiving the instruction, the processor of the gateway device reads the instructions and switches to the gateway mode. The processor may also establish the physical layer connection to the LMR device. The processor may also configure functions of the user interface of the gateway device. Upon completing the mode selection, the processor may output a message through the control interface and the API to the application and the application may display information on the gateway operating in the gateway mode.

During the operation in the gateway mode, in response to the user pressing a button of the gateway device, the processor may interpret the depression and output a notification of the depression to the application through the API and the control interface. The application may then carry out a procedure triggered by the depression. If the depressed button is one that controls the LMR device, the processor may output a corresponding control message to the LMR device through a corresponding interface, e.g. the UART.

In the gateway mode, the buttons may realize inputs to one or more of the following functions: volume up, volume down, duplex call start, duplex call end, push-to-talk (PTT) including enabling microphone of the gateway device, and a toggle button for speaker on/off in the gateway device. One or more LED indicators in the gateway device may illustrate a PTT status, e.g. PTT floor request sent, PTT floor granted. The PTT function may be triggered from the button of the gateway device or from the application of the cellular phone, for example.

The gateway device may further support an audio accessory mode in which the gateway device operates as an audio accessory device for the cellular phone. The gateway device may operate as a headset, for example, by enabling the microphone and the speaker of the gateway device. In this embodiment, the physical layer connection to the LMR device may be omitted. As with the gateway mode, the application may output the instruction to enter the audio accessory mode through the API and the control interface. Upon receiving the instruction, the processor of the gateway device may disable the interface 332 and enable the microphone and the speaker. Audio of the cellular phone may then be delivered to the gateway device and output through the speaker of the gateway device. In a similar manner, voice data acquired from the microphone of the gateway device may be output to the cellular phone for transmission over a voice connection in the cellular network.

The gateway device may further support a LMR mode in which the gateway device operates as an accessory device for the LMR device. The gateway device may enable the microphone and the speaker of the gateway device, as in the audio accessory mode. In this embodiment, the physical layer connection to the cellular phone may be established and the operation of the gateway device may be carried out through the application from the cellular phone. Accordingly, the interface of the gateway device may be used to control the LMR device, e.g. PTT triggers, while the user interface of the cellular phone may be used to control the gateway device in this mode. As with the gateway mode, the application may output the instruction to enter the LMR mode through the API and the control interface. Upon receiving the instruction, the processor of the gateway device may establish the physical layer connection to the LMR device.

Audio of the cellular phone may be delivered to the gateway device and output through the speaker of the gateway device, as in the previous embodiment. In a similar manner, audio of the LMR device may be delivered to the gateway device and output through the speaker of the gateway device. In case the processor 600 receives audio data from both devices simultaneously, the processor 600 may prioritize the audio data from the MR device in this mode. Accordingly, only the audio data from the LMR device would be output to the speaker. The voice data acquired from the microphone of the gateway device may be delivered to the LMR device when the PTT floor has been granted to the LMR device. During an LMR voice call, the audio to/from the cellular phone may be muted.

In an embodiment, the audio prioritization and output in the gateway device may be controlled by the user through the application in the cellular phone.

In the LMR mode, the buttons may realize inputs to one or more of the following functions: volume up, volume down, duplex call start, duplex call end, PTT1 for LMR device, and PTT2 for the cellular phone. One or more LED indicators in the gateway device may illustrate a PTT status, e.g. PTT floor request sent, PTT floor granted. Accordingly, the gateway device may be operated to enable PTT request to a voice call in the cellular network (PTT2 button) and/or in the LMR. The two voice calls may be independent from one another in this mode.

As described above, the gateway may establish the terminal-device level connection between the LMR device connected to the LMR network and the non-LMR device connected to the non-LMR network, e.g. the cellular network or a Wi-Fi network. The LMR network may operate in a direct mode where the LMR user devices manage the LMR network without any centralized controller or a server. This mode is sometimes called a walkie-talkie mode. The LMR network may operate in a trunked mode where the centralized controller manages the LMR network, e.g. channelization, voice groups, etc. In both cases, a plurality of LMR devices may participate in the same voice call in the LMR network of the LMR device. In a similar manner, the non-LMR device may have established a voice call either through a cellular network infrastructure or as a peer-to-peer (group) call.

In a further example, two or more gateway devices may enable wider connection of the different networks to the same call. For example, one gateway device may connect a first LMR network to a cellular network call (group), while another gateway device may connect a second, different LMR network to the cellular network (group) call. The number of different types of the connected radio networks may also be higher than two. For example, the multiple gateway devices may connect more than two radio networks that all support different radio standards. The scalability may depend only on the number of the available gateway devices and how they are configured.

Figure 7:
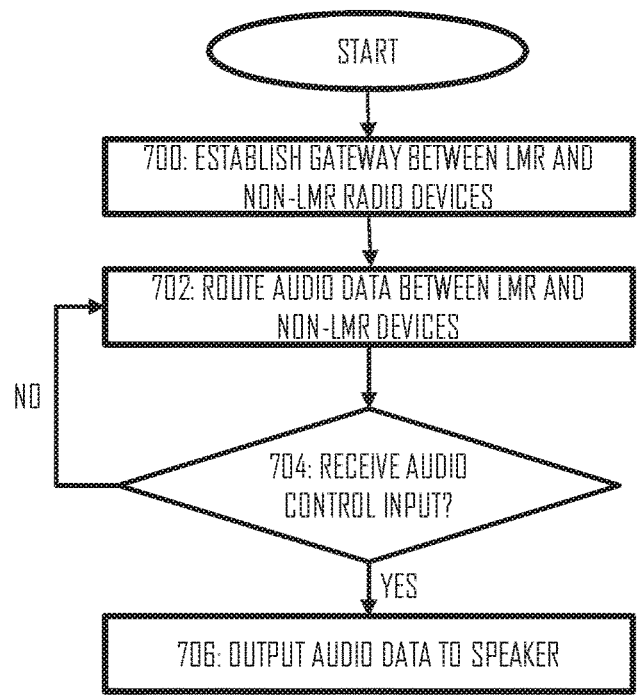
FIG. 7 illustrates a process for controlling audio output in a gateway device according to an embodiment.

As described above, the gateway device may relay the audio data between the LMR device and the non-LMR device and, furthermore, output the audio data to the audio speaker of the gateway device. FIG. 7 illustrates an embodiment of a procedure for controlling the audio output in the gateway device. The procedure may be carried out by the controller 600 in a computer-implemented process. Referring to FIG. 7, the gateway device establishes the gateway between the LMR device and the non-LMR device in block 700. Block 700 may include connecting a voice call between the devices. In block 702, the gateway device routes audio data of the voice call between the LMR device and the non-LMR device. In block 704, upon detecting an audio control input received through the user interface of the gateway device or from the non-LMR device, the gateway device may output the audio data to the speaker(s) of the gateway device in addition to the routing. Another audio control input may disable the audio output through the speaker(s).

Figure 8:
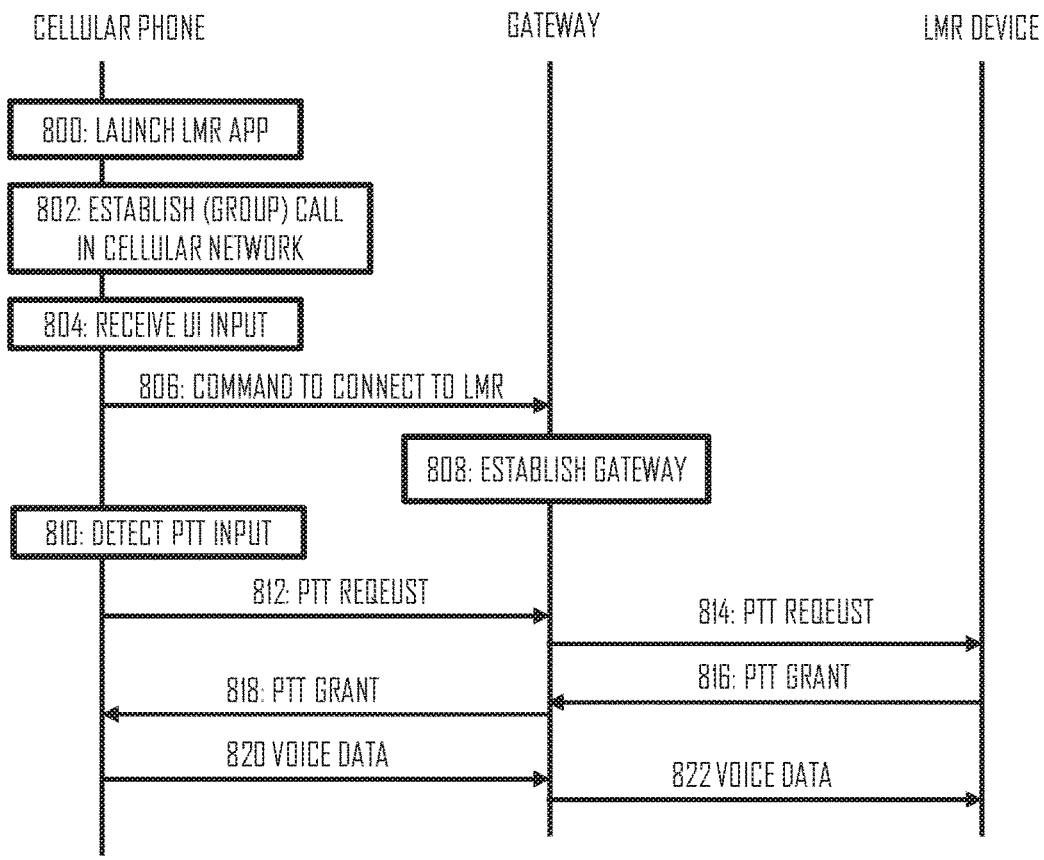
FIG. 8 illustrates a signalling diagram for managing connectivity through the gateway device according to some embodiments.

Let us now describe with an embodiment for connecting and operating a voice call in a situation where the gateway device provides the gateway between the LMR device and the non-LMR device (a cellular phone). FIG. 8 illustrates a signalling diagram of such an embodiment. Referring to FIG. 8, the user may launch the application controlling the management of LMR voice calls in the non-LMR device (block 800). A call group may have been readily established in the LMR network, and the LMR device may have been assigned to the call group. The user may have established the physical layer connections between the LMR device, gateway device, and the non-LMR device.

In block 802, the user may establish a call over the cellular network to another terminal device of the cellular network, another cellular network, or another network. The call may include a voice connection and it may be a conventional voice call or a voice-over-IP (Internet protocol) call. The call may be between two devices or it may be a group call. The call may be established through the application managing the LMR gateway or in a conventional manner. The application may, however, acquire information on the established voice call and display the voice call in the user interface of the cellular phone.

In block 804, the cellular phone receives a user input through the user interface of the application to connect the voice call to the LMR device. In response to the input, the application may generate a command to connect to the LMR device and output the command to the gateway in step 806. Upon receiving the command in step 806, the gateway device may establish the gateway between the LMR device and the non-LMR device (block 808). Before step 806, the gateway device may have maintained a disconnected state between the LMR device and the non-LMR device even though the physical layer connections have been established.

Upon establishing the gateway, the LMR device and the non-LMR device are connected to one another and the voice call of the non-LMR device may be delivered to the LMR network of the LMR device, and vice versa.

In an embodiment, let us assume that the voice call in the cellular network is a full duplex call while the connection in the LMR network is a half-duplex connection. FIG. 8 further illustrates an adaptation between the two duplexing methods as performed by the gateway device. The half-duplex method may utilize a push-to-talk (PTT) concept described next. Referring to FIG. 8, let us assume that the user wishes to speak in the voice call and, as a response, inputs a PTT input to the non-LMR device. The PTT input may be depression of a PTT button in the user interface of the non-LMR device or a voice input. The application may detect the PTT input in block 810 and, as a response, generate a PTT request and output the PTT request to the gateway device in step 812. Upon receiving the PTT request in step e812, the gateway device may forward the PTT request, optionally in an adapted form, to the LMR device in step 814. The LMR device may then output the PTT request in the LMR network. An entity managing the requests, e.g. a centralized controller, may handle the PTT request and grant the floor. The grant may be signalled in the LMR network. Upon detecting the PTT grant, the LMR device may output the PTT grant to the gateway device (step 816), and the gateway device may forward the PTT grant to the non-LMR device (step 818). Upon detecting the PTT grant, the application may start outputting the voice data to the LMR device through the gateway device (steps 820 and 822).

In an embodiment where the PTT input is voice-triggered, the application may start recording the voice data of the user between steps 810 and 818 such that the voice data recorded can be delivered to the LMR network when the PTT grant has been provided. After acquiring the grant, the application may output the voice data recorded before step 818 and voice data recorded after the step 818 to the LMR device.

In an embodiment where the application manages the PTT requests in the LMR network, the procedure may be similar except for that the LMR device triggers the PTT request and the non-LMR device manages the PTT request. The input triggering the PTT request may be a PTT request detected by the LMR device in the LMR network or the user depressing the PTT button in the gateway device or the LMR device.

In an embodiment, the gateway device receives digital non-voice data from the non-LMR device, converts the digital non-voice data, and transmits the converted non-voice data to the LMR device. In addition to the voice connection, a data connection may be established by the gateway device between the devices. The data connection may deliver text messages or even video data during the call.

Figure 9:
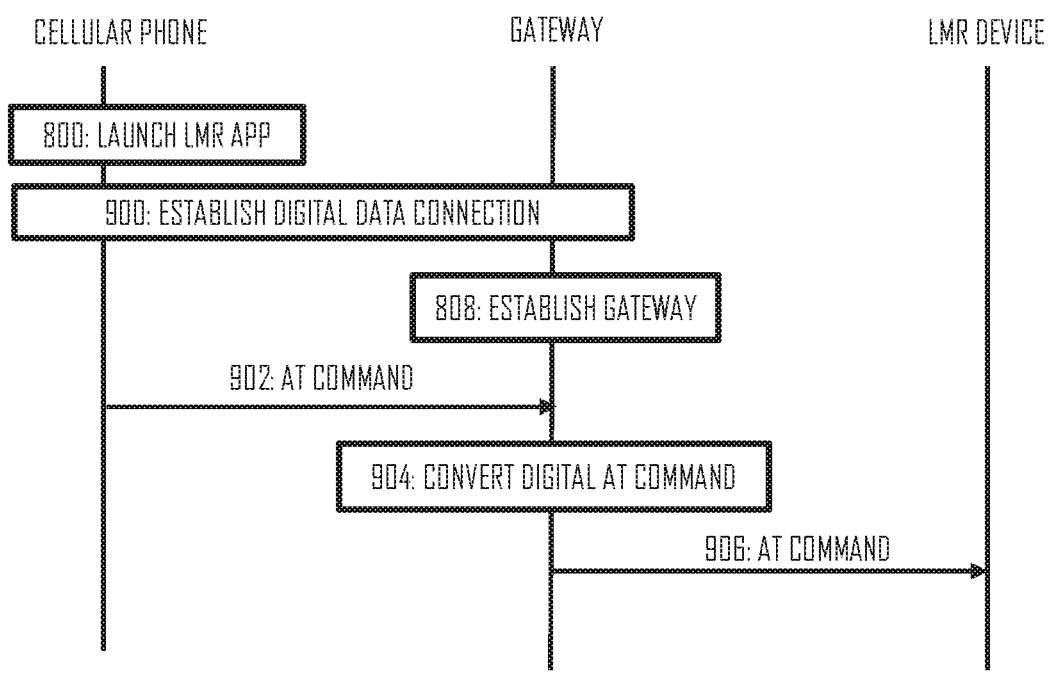
FIG. 9 illustrates a procedure for delivering AT commands according to an embodiment.

In an embodiment, the digital non-voice data comprises an AT command for the second device or for the gateway device. An AT command is an instruction used to directly control a radio modem and it is an abbreviation from Attention. An AT command may control establishment or answering of a voice call or to acquire information from the radio modem. FIG. 9 illustrates an embodiment where the LMR device is controlled from the application executed in the non-LMR device. Blocks denoted by the same reference numbers as in FIG. 8 may represent the same or substantially similar operations. Referring to FIG. 9, upon launching the application, a digital data connection may be established at least between the non-LMR device and the gateway (block 900). The digital data connection may be the USB connection, and the USB connection may be used to deliver the AT commands from the non-LMR device to the LMR device. Upon generating the AT command by the application and transmitting the AT command to the gateway in step 902 over the digital data connection, the gateway receives the digital AT command in step 902. In block 904, the gateway device converts the digital AT command to a format suitable for inputting to the LMR device. In some embodiments, this may comprise performing a D/A conversion. In step 906, the gateway device transmits the converted AT command to the LMR device, and the LMR device performs a function instructed by the AT command.

Above, the processor 600 may be realized by a processing circuitry, As used in this application, the term 'circuitry' refers to all of the following: (a) hardware-only circuit implementations, such as implementations in only analogue and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Some embodiments described may also be carried out in the form of a computer process defined by a computer program or portions thereof. Embodiments of the methods described in connection with FIGS. 2 and 7 to 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method for connecting wireless networks, the method comprising:
    establishing, by a gateway device, a first physical layer connection with a first device of a two-way radio network operating according to a two-way radio network protocol,
    establishing, by the gateway device, a second physical layer connection with a second device of a wireless network operating according to a wireless communication protocol different from the two-way radio network protocol; and
    connecting, by the gateway device, a full duplex communication connection established between the second device and the wireless network to the first device through the first physical layer connection and the second physical layer connection and performing, by the gateway device, adaptation between the full duplex communication connection and half duplex communication of the two-way radio network,
    wherein the gateway device is an accessory device of at least one of the first device and the second device.

2. The method of claim 1, wherein said performing the adaptation comprises as performed by the gateway device:
    receiving a push-to-talk request from one of the first device and the second device;
    adapting the push-to-talk request for the other one of the first device and the second device and transmitting the adapted push-to-talk request to the other one of the first device and the second device;
    receiving, from the other one of the first device and the second device, a push-to-talk grant message; and
    adapting the push-to-talk grant message for the one of the first device and the second device and transmitting the adapted push-to-talk grant message to the one of the first device and the second device.

3. The method of claim 1, wherein first physical layer connection and the second physical layer connection are wired connections.

4. The method of claim 3, wherein the gateway device is integrated into a cable connecting the first device and the second device.

5. The method of claim 1, further comprising:
    receiving, by the gateway device, digital non-voice data of the communication connection from the second physical layer connection; and
    converting, by the gateway device, the digital non-voice data and transmitting the converted non-voice data to the first physical layer connection.

6. The method of claim 1, further comprising:
    receiving, by the gateway device, an AT command from the second device over the second physical layer connection; and
    extracting the AT command and performing, by the gateway device, a function instructed by the AT command.

7. The method of claim 1, further comprising by the gateway device:
    providing, by the gateway device, a device-to-device communication connection between the first device and the second device while neither the first device nor the second device is connected to a base station of the respective network.

8. A gateway device comprising:
    a first interface configured to provide a first physical layer connection with a first device of a two-way radio network operating according to a two-way radio network protocol,
    a second interface configured to provide a second physical layer connection with a second device of a wireless network operating according to a wireless communication protocol different from the two-way radio network protocol; and
    processing circuitry configured to connect a full duplex communication connection established between the second device and the wireless network to the first device through the first physical layer connection and the second physical layer connection and to perform adaptation between the full duplex communication connection and half duplex communication of the two-way radio network,
    wherein the gateway device is an accessory device of at least one of the first device and the second device.

9. The gateway device of claim 8, further comprising audio conversion circuitry configured to perform audio conversion between the first physical layer connection and the second physical layer connection.

10. The gateway device of claim 9, wherein the audio conversion circuitry is configured to output an audio signal received from one of the first physical layer connection and the second physical layer connection and output the audio signal in a converted form to the other one of the first physical layer connection and the second physical layer connection, and further configured to output audio signal in a converted form to an audio speaker of the gateway device.

11. The method of claim 8, wherein the gateway device is integrated into a cable configured to connect the first device and the second device.

\* \* \* \* \*